US011132472B2

(12) United States Patent
Tkaczyk

(10) Patent No.: US 11,132,472 B2
(45) Date of Patent: Sep. 28, 2021

(54) USE OF INTERMEDIARY DEVICES FOR CONTROL OF PORTABLE COMPUTERS AND MOBILE DEVICES

(71) Applicant: International Business Machines Corporation, Armonk, NY (US)

(72) Inventor: Gregory M. J. H. Tkaczyk, Burlington (CA)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 16/203,787

(22) Filed: Nov. 29, 2018

(65) Prior Publication Data
US 2020/0175210 A1 Jun. 4, 2020

(51) Int. Cl.
*G06F 21/88* (2013.01)
*H04W 88/04* (2009.01)
(Continued)

(52) U.S. Cl.
CPC .............. *G06F 21/88* (2013.01); *G06F 9/542* (2013.01); *G06F 21/62* (2013.01); *H04L 63/08* (2013.01);
(Continued)

(58) Field of Classification Search
CPC ......... H04L 63/08; H04L 63/10; H04L 63/20; G06F 21/62; G06F 21/88; H04W 12/08;
(Continued)

(56) References Cited

U.S. PATENT DOCUMENTS 8,467,768 B2* 6/2013 Mahaffey ................ H04L 63/14
455/411
8,548,499 B2* 10/2013 Ortiz ..................... H04W 4/025
455/456.1
(Continued)

FOREIGN PATENT DOCUMENTS

WO 2016080986 5/2016

OTHER PUBLICATIONS

J. Granjal, E. Monteiro and J. Sá Silva, "Security for the Internet of Things: A Survey of Existing Protocols and Open Research Issues," in IEEE Communications Surveys & Tutorials, vol. 17, No. 3, pp. 1294-1312, thirdquarter2015. (Year: 2015).*

(Continued)

*Primary Examiner* — Kari L Schmidt
(74) *Attorney, Agent, or Firm* — VanLeeuwen & VanLeeuwen; Jeffrey S. LaBaw

(57) ABSTRACT

An approach is disclosed that transmits a command from an initiating device, the command being directed to a target device and the initiating device is disconnected from the target device. The command is sent through any number of receiving devices to eventually be received by the target device with the other receiving devices being intermediate devices. The approach identifies a set of connectivity conduits between the receiving devices where at least one of the connectivity conduits is between one of the intermediate devices and the target device. The initiating device receives a confirmation from one of the intermediate device that the command was transmitted to the target device by the intermediate device.

14 Claims, 10 Drawing Sheets

(51) Int. Cl.
| | |
|---|---|
| *G06F 9/54* | (2006.01) |
| *H04W 76/14* | (2018.01) |
| *H04W 76/18* | (2018.01) |
| *G06F 21/62* | (2013.01) |
| *H04L 29/06* | (2006.01) |
| *H04W 12/08* | (2021.01) |
| *H04W 4/80* | (2018.01) |

(52) U.S. Cl.
CPC ............. *H04L 63/10* (2013.01); *H04L 63/20* (2013.01); *H04W 12/08* (2013.01); *H04W 76/14* (2018.02); *H04W 76/18* (2018.02); *H04W 88/04* (2013.01); *H04W 4/80* (2018.02)

(58) Field of Classification Search
CPC ......... H04W 12/0027; H04W 12/1206; H04W 76/14; H04W 76/18; H04W 88/04
See application file for complete search history.

(56) References Cited

U.S. PATENT DOCUMENTS

| | | | |
|---|---|---|---|
| 9,009,230 B1* | 4/2015 | Matthieu | H04L 67/12 709/204 |
| 9,071,518 B2* | 6/2015 | Malik | H04W 12/0027 |
| 9,106,272 B2 | 8/2015 | Marcovecchio et al. | |
| 9,538,384 B2* | 1/2017 | Donnellan | H04W 12/06 |
| 9,626,008 B2 | 4/2017 | Brewer | |
| 9,710,678 B2 | 7/2017 | D'sa | |
| 9,838,390 B2* | 12/2017 | Zakaria | H04W 4/24 |
| 9,973,593 B2* | 5/2018 | Sorenson, III | H04L 67/1014 |
| 10,292,060 B2* | 5/2019 | Alexander | H04W 24/04 |
| 10,327,314 B1* | 6/2019 | Shin | H05B 47/19 |
| 10,778,659 B2* | 9/2020 | Tola | H04L 67/12 |
| 10,791,560 B2* | 9/2020 | Sarwar | H04W 72/082 |
| 10,805,200 B2* | 10/2020 | Erickson | H04W 12/069 |
| 10,833,939 B2* | 11/2020 | Tkaczyk | H04L 63/10 |
| 2008/0177811 A1 | 7/2008 | Cannon | |
| 2009/0013210 A1 | 1/2009 | McIntosh | |
| 2010/0217837 A1 | 8/2010 | Ansari | |
| 2012/0196571 A1 | 8/2012 | Grkov | |
| 2013/0237191 A1* | 9/2013 | Mahaffey | H04L 41/026 455/411 |
| 2014/0223322 A1* | 8/2014 | Slack | H04W 8/245 715/740 |
| 2015/0089659 A1* | 3/2015 | Beckman | H04L 63/02 726/26 |
| 2016/0072670 A1* | 3/2016 | Matthieu | H04L 41/0806 709/204 |
| 2016/0179624 A1* | 6/2016 | Stuntebeck | G06F 11/1458 707/653 |
| 2016/0232349 A1* | 8/2016 | Baeder | G06F 21/561 |
| 2017/0048904 A1* | 2/2017 | Monaghan | H04L 1/1825 |
| 2019/0045346 A1* | 2/2019 | Madeira | H04W 8/005 |
| 2019/0332824 A1 | 10/2019 | Patwardhan | |
| 2020/0120500 A1* | 4/2020 | Sharma | H04W 12/02 |
| 2020/0186383 A1* | 6/2020 | Sebastian | H04L 67/2823 |
| 2020/0252430 A1* | 8/2020 | Peacock | H04L 67/125 |
| 2021/0144210 A1* | 5/2021 | Kolhapure | H04L 12/66 |

OTHER PUBLICATIONS

Lesi, Vuk, Zivana Jakovljevic, and Miroslav Pajic. "Reliable industrial iot-based distributed automation." Proceedings of the International Conference on Internet of Things Design and Implementation. 2019, pp. 94-105. (Year: 2019).*
"How to remotely wipe your Windows 10 Mobile device via Exchange OWA," The Knowledge Base, MIT Information & Technology website, downloaded Sep. 2017, 4 pages.
"How do I request a Remote Wipe of my Mobile Device," Ulster University ISD, 2013, 4 pages.
Wallen, "Remotely wipe your Android device with the help of Google," TechRepublic, Jun. 2014, 13 pages.
"List of IBM Patents or Patent Applications Treated as Related," Letter from Leslie A. Van Leeuwen, Nov. 29, 2018, 1 page.
Tkaczyk, "Providing Positive Confirmation of a Mobile or Portable Computer Wipe," U.S. Appl. 16/203,808, filed Nov. 29, 2018, 45 pages.

* cited by examiner

USE OF INTERMEDIARY DEVICES FOR CONTROL OF PORTABLE COMPUTERS AND MOBILE DEVICES

BACKGROUND

Mobile devices and laptops are lost or stolen every day. These devices may contain sensitive personal or corporate information. Additionally, IT departments require methods to remotely control devices, such as in the case of an employee termination. Existing methods to remotely control such devices include via Mobile Device Management (MDM) platforms, via ActiveSync or via vendor provided capabilities (e.g. Find My iPhone). A typical function used in such situations is to initiate a wipe of the device, to prevent sensitive information from being disclosed. However, these methods require that the device have connectivity to a management system via the Internet, via local wired or wireless networks, or that the device can receive a text message. A lost or stolen device may not have Internet access due to its location, may not have a cellular antenna (e.g. a tablet), or it could have WiFi or cellular data capabilities disabled.

Today's remote management methods execute commands on a per device basis. They do not consider that multiple devices may be used by the same individual, and therefore that these devices may be in close physical proximity to one another, or on the same communications network. For example, a corporate employee may own and carry a smart phone, a smart watch, a tablet, and corporate laptop each of which has corporate data on it. Additionally, traditional approaches do not consider that devices belonging to different individuals may be in close physical proximity to one another, or on the same communications network. For example, devices assigned to members of a project team, a department, or individuals within a meeting room. In the case of a lost or stolen bag, several of these devices may be missing simultaneously, and therefore be physically close to one another for some period of time.

SUMMARY

An approach is disclosed that transmits a command from an initiating device, the command being directed to a target device and the initiating device is disconnected from the target device. The command is sent through any number of receiving devices to eventually be received by the target device with the other receiving devices being intermediate devices. The approach identifies a set of connectivity conduits between the receiving devices where at least one of the connectivity conduits is between one of the intermediate devices and the target device. The initiating device receives a confirmation from one of the intermediate device that the command was transmitted to the target device by the intermediate device.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages will become apparent in the non-limiting detailed description set forth below.

BRIEF DESCRIPTION OF THE DRAWINGS

This disclosure may be better understood by referencing the accompanying drawings, wherein.

DETAILED DESCRIPTION

Figure 1:
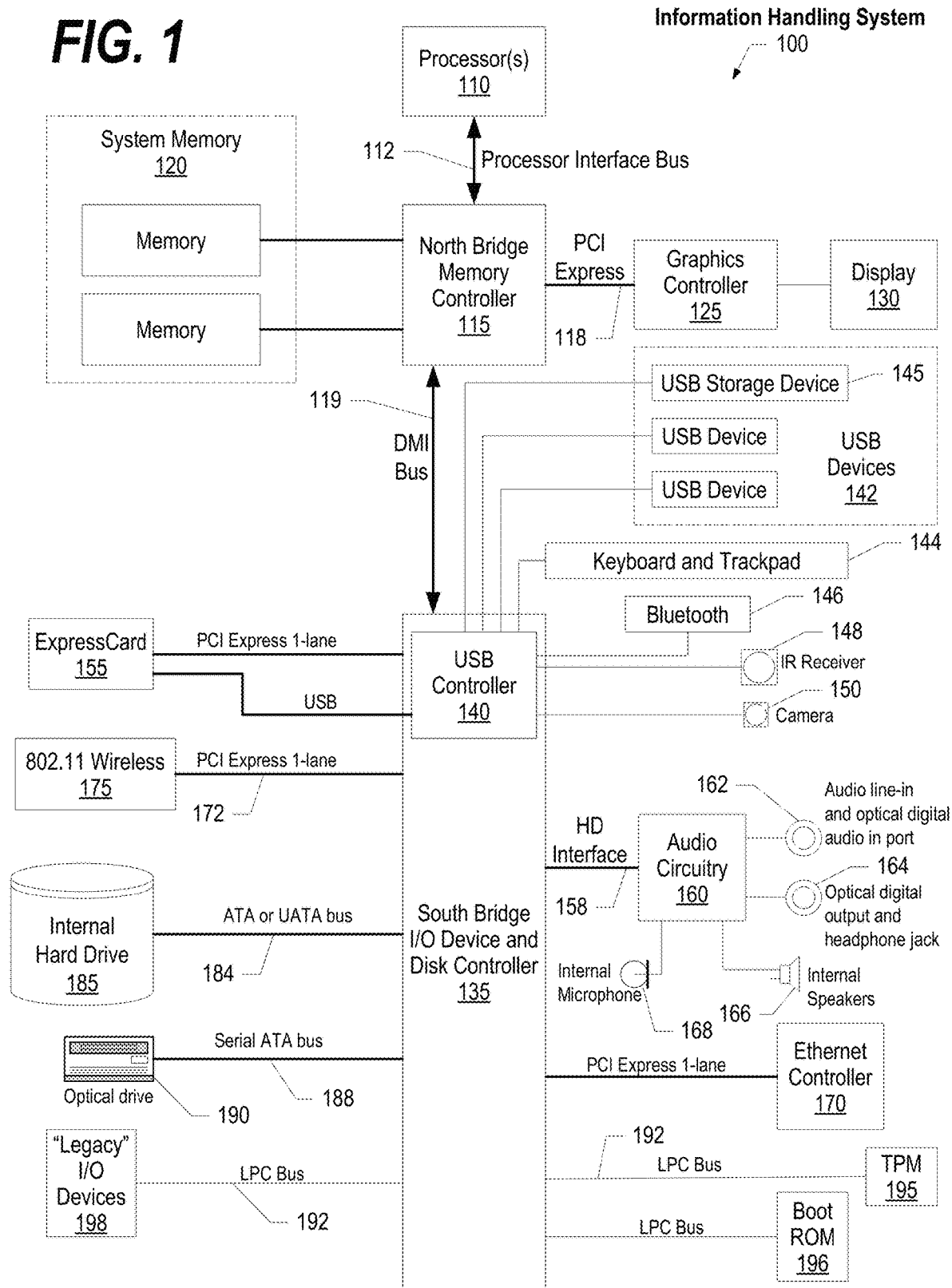
FIG. 1 is a block diagram of a data processing system in which the methods described herein can be implemented.

FIGS. 1-10 depict an approach that allows an intermediary mobile or portable computing device to execute an action, such as device wipe, on other unreachable devices. For example, a wipe command initiated on a mobile phone connected to the MDM platform, could first try to establish communications to other known devices using any or all of available transport, and send a wipe command to them. This could include wireless transport (e.g. WiFi, Bluetooth, NFC), physical transport (e.g. via a USB cable from a mobile device to a computer, Ethernet cable from laptop to a physical network which is also connected to WiFi), and audio transport (e.g. sounds waves where MDM agent on the other device is listening for certain sounds).

Once other managed devices in proximity to the mobile phone have executed the command, the phone itself would execute the command. In addition, the invention addresses the case of multiple layers of inaccessible devices. More generally, this concept can be expanded to separate target devices, from those devices simply trying to identify and facilitate communication with the targets (see detailed description with reference to individual drawings below).

A second aspect of the approach is to gather connectivity details that describe the available connections between managed devices. The connectivity details can then be used by the management system to support other functions, such as alerting, identification of abnormal behavior, or prediction of future state connectivity.

Such a function could be built into the operating system of a mobile device, a mobile application, or into an MDM platform/agent. An initial use case for this functionality is for remote wipe, but the ability to control mobile devices via an intermediary device could be extended for other support functions (i.e. send a text with your GPS coordinates, turn on WiFi, etc).

The novel functions proposed by this approach are: (1) the use of various physical connections of intermediary devices to establish communications between inaccessible devices and the management system; (2) the use of various wireless communication capabilities of intermediary devices to establish communications between inaccessible devices and the management system; (3) the use of audio communication capabilities of intermediary devices to establish communications between inaccessible devices and the management system; (4) defining participating devices as Targets for command execution, and Searchers for device identification; (5) the capability to gather connectivity details between managed devices, or a selected subset of managed devices; (6) the ability to take action within the management system when connectivity conditions are met (e.g. trigger an alert when these two devices are in close proximity—possible indicator of collusion or fraud); (7) the use of the management system to identify trends and abnormalities in the connectivity graphs; (8) the use of machine learning or cognitive technologies in the management system to draw insights from connectivity graphs; and (9) the use of machine learning or cognitive technologies in the management system to predict optimal connectivity search patterns for future state (e.g. "In the past we see this targeted device only accessible via this intermediary over Bluetooth, so try that first").

The following definitions are used in describing the approach disclosed herein. "Management system"—the system or application interfacing with a human that initiates the first communication to an "accessible device". In an enterprise use case, this could be a Mobile Device Management (MDM) system. In a consumer use case, this could be the originating mobile operating system, or mobile application. "Inaccessible device"—Devices that are registered within the management system as a device under management, however that cannot be directly accessed at a given point in time. "Accessible device"—Devices that can be directly accessed by the management system, or indirectly accessed via an intermediary device. An inaccessible device becomes an accessible device if can be accessed through an intermediary device. "Intermediary device"—A device that facilitates communication between the management system or other intermediary device, and one or more inaccessible devices. An intermediary device is also an accessible device. "Searcher"—a device that searches for Targets over all transport, or a subset of selected transport. A Searcher can be accessible or inaccessible. "Target"—a device that is being searched for so that a command can be executed. A target can be accessible or inaccessible.

The following describes a potential use case of the approach disclosed herein. First, a use case for ad hoc search for, and command execution on, inaccessible devices. In this use case, the approach selects transport methods to be used for communication attempts (e.g. wireless, physical, audio as described above). Determine whether all available connections between devices should be identified, or first available connection (in a preferred order) should be used. Next, the approach identifies all Targets on which to execute the command. (e.g. all devices owned by an individual, all devices within a department, a specific device owned by an individual, all devices, etc). The approach also identifies all Searcher devices that will participate. (e.g. all devices owned by an individual, all devices within a department, all devices known to be in a meeting room, all devices in the enterprise, etc). Note that Targets can also be Searchers, in which case they will conclude their search prior to executing the command. In addition, the approach identifies all Searchers which are currently accessible, and therefore determine inaccessible Searchers and further identifies all Targets which are currently accessible, and therefore determine inaccessible Targets.

For all accessible Targets that are not Searchers, the approach executes the command or schedules command execution. For each accessible Target that is a Searcher, if there are no inaccessible targets remaining, the approach executes the command or schedules command execution. Otherwise the approach schedules command execution prior to continuing search (in case connectivity fails). For each accessible Searcher, the approach uses device connection details to attempt communication to all inaccessible targets and searchers across all selected transport. The approach then communicates the list of successful executions to caller (management system or intermediary device).

Key steps to be considered are as follows. The approach leverages any insight or prior knowledge available to optimize the search (e.g. last known IP addresses, preferred communication methods of target, connectivity graph history and trends, etc). In one embodiment, the approach further prioritizes exploration for inaccessible targets over inaccessible searchers. In one embodiment, the approach uses a "depth-first" or "breadth-first" algorithm. If the approach is successful on an inaccessible target that is not a searcher, then the approach marks the device as an accessible target and executes or schedules the command on the device. If there are no inaccessible targets remaining, the approach communicates the list of successful executions to caller and exits.

If the approach is successful on an inaccessible target that is also a searcher, then the approach marks the device as an accessible searcher target. If there are no inaccessible targets remaining, then the approach executes the command or schedules command execution on the device, communicates the list of successful executions back to the caller and exits. Otherwise, the approach schedules the command execution (in case of lost connectivity) and begins the connectivity exploration algorithm for all remaining inaccessible targets and searchers from this device.

If successful on an inaccessible searcher, mark the device as an accessible searcher and begin graph exploration for all remaining inaccessible targets and searchers from this device.

Due to the recursive nature of the algorithm, the caller (management system or searcher) determines whether to continue searching or exit function. Exit when there are no inaccessible targets left, or the graph exploration has been exhausted (i.e. all selected communication attempts for all targets have occurred from all searchers).

If all attempts have been completed, and there are still inaccessible targets remaining, use management system to send a SMS message to those with cellular capabilities (use of SMS for device control exists today). Additionally, any other communication methods that are not dependent on physical or logical proximity can be attempted.

Furthermore, in one embodiment the approach functions in a manner where the detailed device search is occurring in either a sequential manner, or in a parallel processing manner (i.e. multiple accessible devices may be searching simultaneously, and an inaccessible device may be located from different Searchers, over various transports). The connectivity details gathered from this exploration can be displayed within the management system, and used by cognitive and machine learning technologies to improve future searches.

The use case described above specifies a mechanism where a search is conducted for specified targets in order to execute a command. Alternatively, the search can be conducted without command execution, simply to periodically update the known connectivity between managed devices. In this manner, the constructs of Searchers and Targets can be maintained, if the intent is to prepare for specific future scenarios of command execution. Alternatively, broader connectivity details can be gathered for the selected devices, where every device is simply considered accessible or inaccessible—in effect where all devices are Searchers and Targets. Accessible devices initially start to identify all other selected devices over all selected transport protocols. If an inaccessible device is located, a detailed device exploration algorithm proceeds to identify all other devices from the device. Periodically updating the connectivity details could be performed for all managed devices, or a subset of related devices (e.g. by employee, by department, by physical location). This would provide the management system with data that could be analyzed via cognitive or machine learning technologies.

A consequence of using intermediary devices to locate inaccessible devices and execute commands on them, is that the discovered peer-to-peer relationships between devices can be centrally consolidated and used for further analysis. This can be displayed as a connectivity graph where the nodes represent devices, and the edges between nodes are available connectivity between them. The data points collected for each device include, for example: (1) device identifier for all peers; (2) transport type for each peer relationship (e.g. "I have a connection to Device_X on WiFi but never Bluetooth"); (3) transport metadata (e.g. "I only have WiFi connectivity to Device_X when I am on a WiFi network with SSID 'Home_Wifi'"); and (4) time related data (e.g. "I typically have WiFi connectivity to Device_X on 'Home_Wifi' between 7 pm and 7 am").

The consolidation of such data into a management system allows for graphical visualization of the relationships, allowing an administrator to conduct manual analysis or investigations (e.g. for example, when one employee steals a phone from another employee). Furthermore, the management system could: (1) take action when connectivity conditions are met (e.g. trigger an alert when these two selected devices are in close proximity as due to business processes, this may be a possible indicator of collusion or fraud, or a separation of duties violation); (2) identify trends and abnormalities in the connectivity graphs; (3) use machine learning or cognitive technologies to draw insights from connectivity graphs; (4) use machine learning or cognitive technologies to predict optimal connectivity search patterns for future state (e.g. "In the past we see this targeted device only accessible via this intermediary over Bluetooth, so try that first").

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium does not include a computer readable signal medium.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or other programming languages such as Swift, Objective-C, Java, Kotlin, C++, etc. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 2:
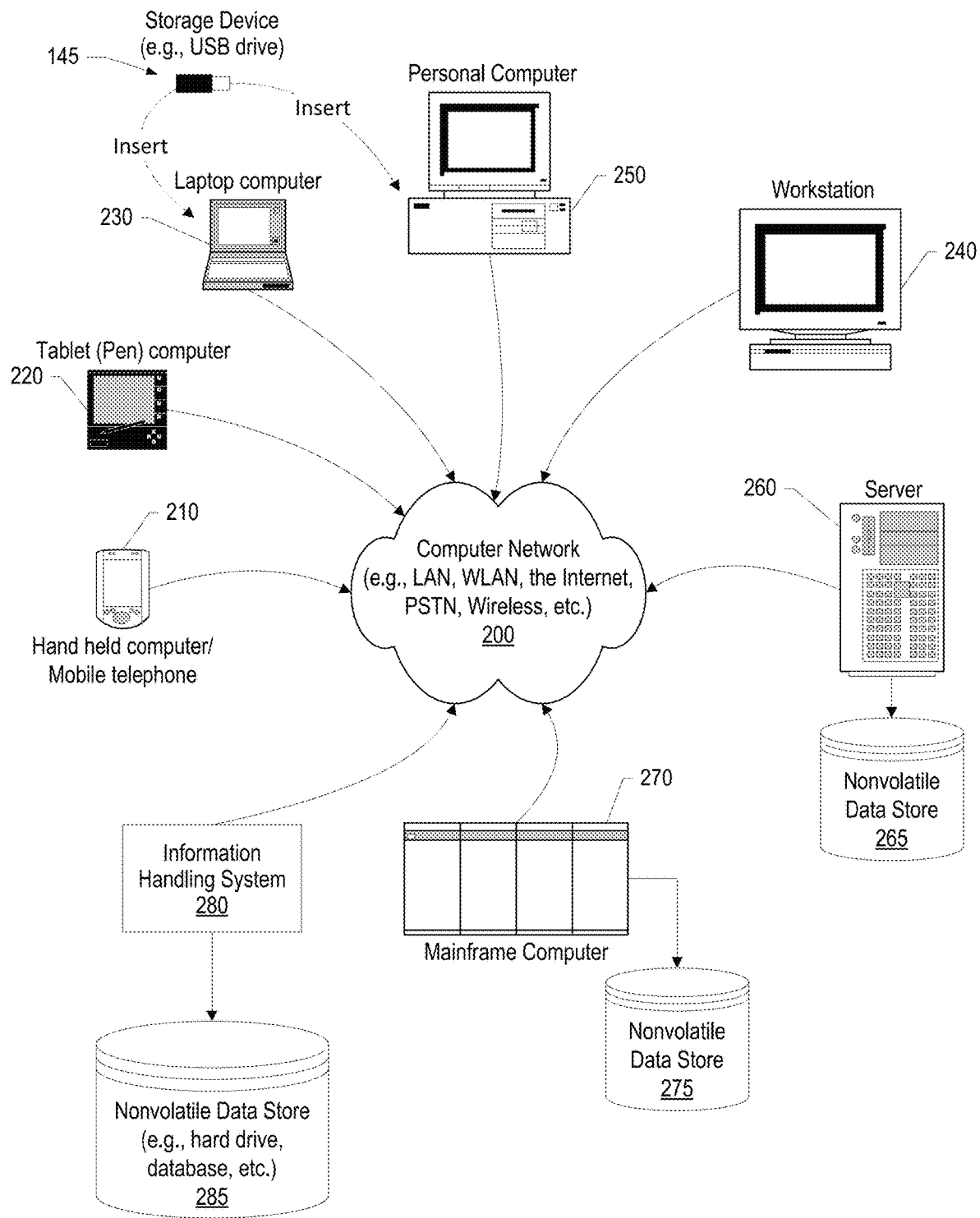
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/smart mobile telephone 210 to large mainframe systems, such as mainframe computer 270. Examples of handheld computer 210 include mobile telephones, smart phones, personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
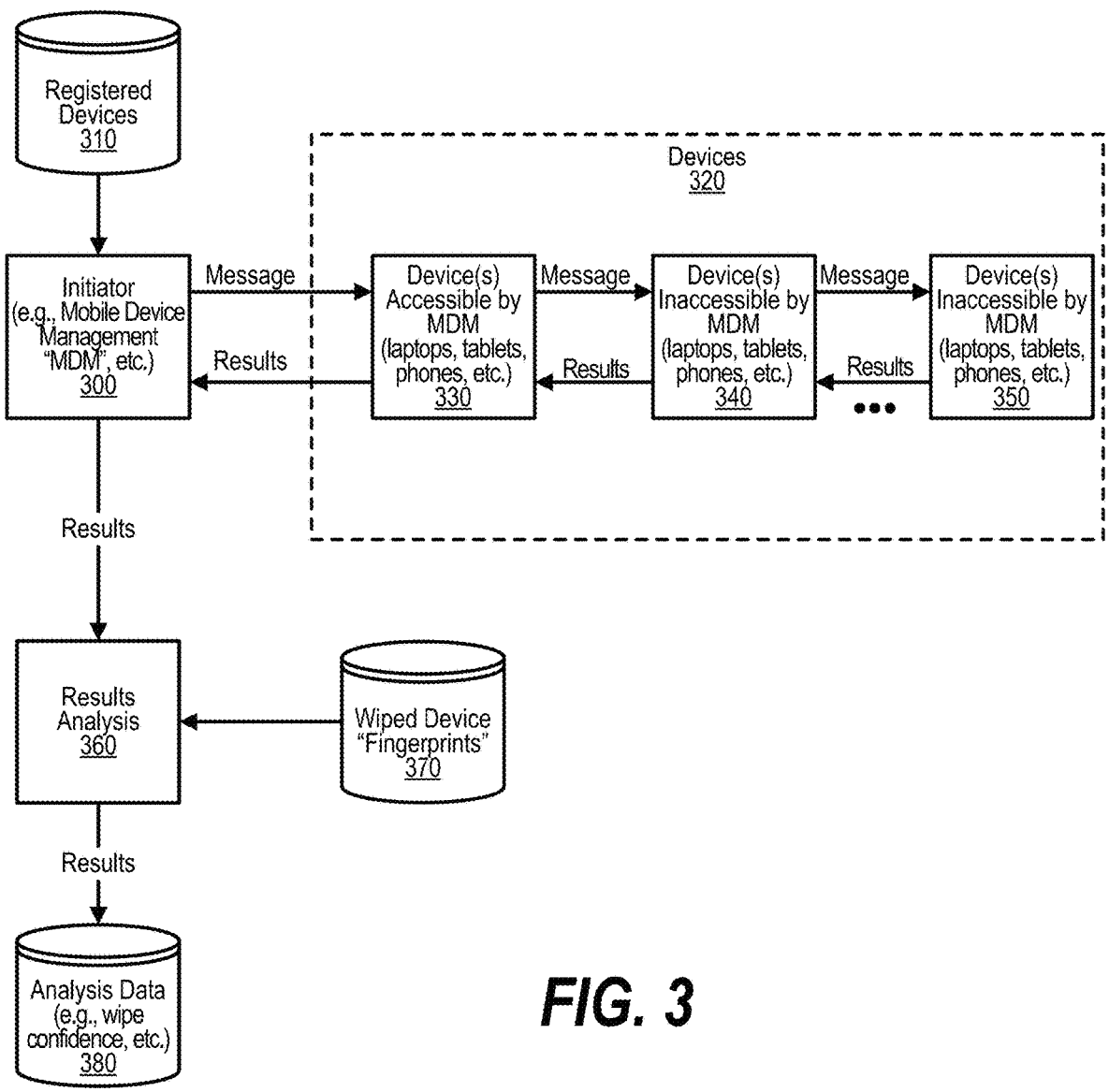
FIG. 3 is a component diagram depicting the components involved in the cognitive use of intermediary devices for control of portable computers and mobile devices.

FIG. 3 is a component diagram depicting the components involved in the cognitive use of intermediary devices for control of portable computers and mobile devices. Initiating device 300, such as one operated by an administrator of an organization, sends commands to other devices 320 owned or operated by the organization. Data pertaining to the devices owned or operated by the organization is retrieved from registered devices data store 310, such as the device model, type, operating system, connectivity data (e.g., network address, etc.) and employee or other user to whom the device is currently registered.

Some of devices 320 (devices 330) may be currently accessible to initiating device 300, such as being on a common computer network or connected via cable to the initiating device. Other devices (340 and 350) may be currently disconnected and not directly accessible by initiating device 300. While an inaccessible device might not be directly accessible by initiating device 300, the device might be accessible by another device, perhaps over a different communication protocol. For example, perhaps the inaccessible device is a tablet system that is in a hotel far away from the initiating device and the tablet system is currently disconnected from a network, such as the Internet. However, a smart phone is at a location proximate to the tablet system and can communicate with the tablet system using a different communication protocol.

For example, the smart phone might communicate with the initiating device using a wireless network and also communicate with the tablet system using a different protocol, such as Bluetooth communications protocol or over a USB connection. In this case, the smart phone acts as an intermediate device, receiving the request from initiating device 300 and passing the command along to the tablet system. In one embodiment, the intermediate device gathers data from the target device (e.g., the tablet system in the example above, etc.) and forwards the gathered data back to the initiating device, perhaps through other intermediate devices. In the manner shown, multiple levels of intermediate devices can be between the initiating device and the target device with these levels of intermediate devices communicating on perhaps different communication protocols based on the current environment.

One command that can be sent from the initiating device to a target device is a wipe command or instruction that instructs the target device to wipe data from storage of the target device and revert to a known system setting, such as a factory setting. As used herein, a wipe command removes some or all data from one or more memories of a device and these memories can be non-volatile or volatile memories with non-volatile memories being any non-volatile based memory, such as disk storage, flash memory, ferroelectric RAM, solid state drives, and the like. In one embodiment, a wipe command reverts the device to a factory setting before user data was stored on the device (e.g., a usable device with an operating system but without user data, etc.). When a wipe command is transmitted to the target device, then a device, or devices, that is proximate to the target device gather communication data and other data from the target device regarding the wipe command. In one embodiment, the proximate device gathering data may be the transmitting device. In alternative embodiments, the proximate devices gathering data may be a set of devices that may include, or may not include, the transmitting device. The transmitting device can be the initiating device that initially transmitting the command or can be an intermediate device that transmitted the instruction to the target device on behalf of the initiating device. The data gathered includes a response, or acknowledgement, that the target device received the wipe command. In addition, the proximate device gathers data from the target device after the wipe command should have been executed at the target device.

This post-wipe instruction data includes connectivity data from the target device, both when the target device stops communicating due to the wipe instruction being processed, as well as connectivity data regarding the target device after the wipe instruction has been fully processed (e.g., initial search of the device for nearby network connections, Bluetooth connections, etc.). Furthermore, the proximate device(s) can also gather non-connectivity data such as sounds emanating from the target device captured by the proximate device's microphone, and visual data pertaining to any data that might appear on the target device's display screen and captured by the proximate device's digital camera. Timing data relating to the connectivity and non-connectivity activities detected is also gathered. For example, when the wipe command is transmitted to the target tablet system, timing data related to when the tablet system ceased communicating with the intermediate device over the communication protocol (e.g., USB, Bluetooth, network, etc.) is captured as well as the activities after the tablet system was restored to factory settings (e.g., searching for nearby network/Bluetooth connections, other observable features/functions that are enabled when in a factory default state, etc.) as well as sound data (e.g., the factory installed operating system startup sounds, etc.) and any captured display data (e.g., the factory installed setup screen that appears when device initially setup, etc.). Additionally, the proximate devices may attempt active communications with the target device, and record responses to such active queries. The "searcher" device is an intermediate device. If the searcher device is proximate to the target device, then the searcher device might be able to be used to gather additional data from the target device (e.g., if the target device is being wiped, etc.).

Data gathered by the proximate device(s), such as one of the intermediate devices, is returned to initiating device 300 for analysis. Results analysis 360 is performed by comparing the gathered post-wipe instruction data to wiped device "fingerprint" data that is retrieved from data store 370. The fingerprint data is the expected activity from the given target device based on the device's type and current operating system, firmware, etc. This comparison data can be used to generate a confidence score indicating the level of confidence that target device was successfully wiped. For example, if the target device was a tablet system containing sensitive organizational data and the device was stolen from an employee's hotel room, then the analysis results and confidence score could be used in data security audits and the like to provide assurances to investors, customers, clients, etc. that the organization's sensitive data has been adequately protected. This resulting analysis data and confidence score is stored in data store 380.

Figure 4:
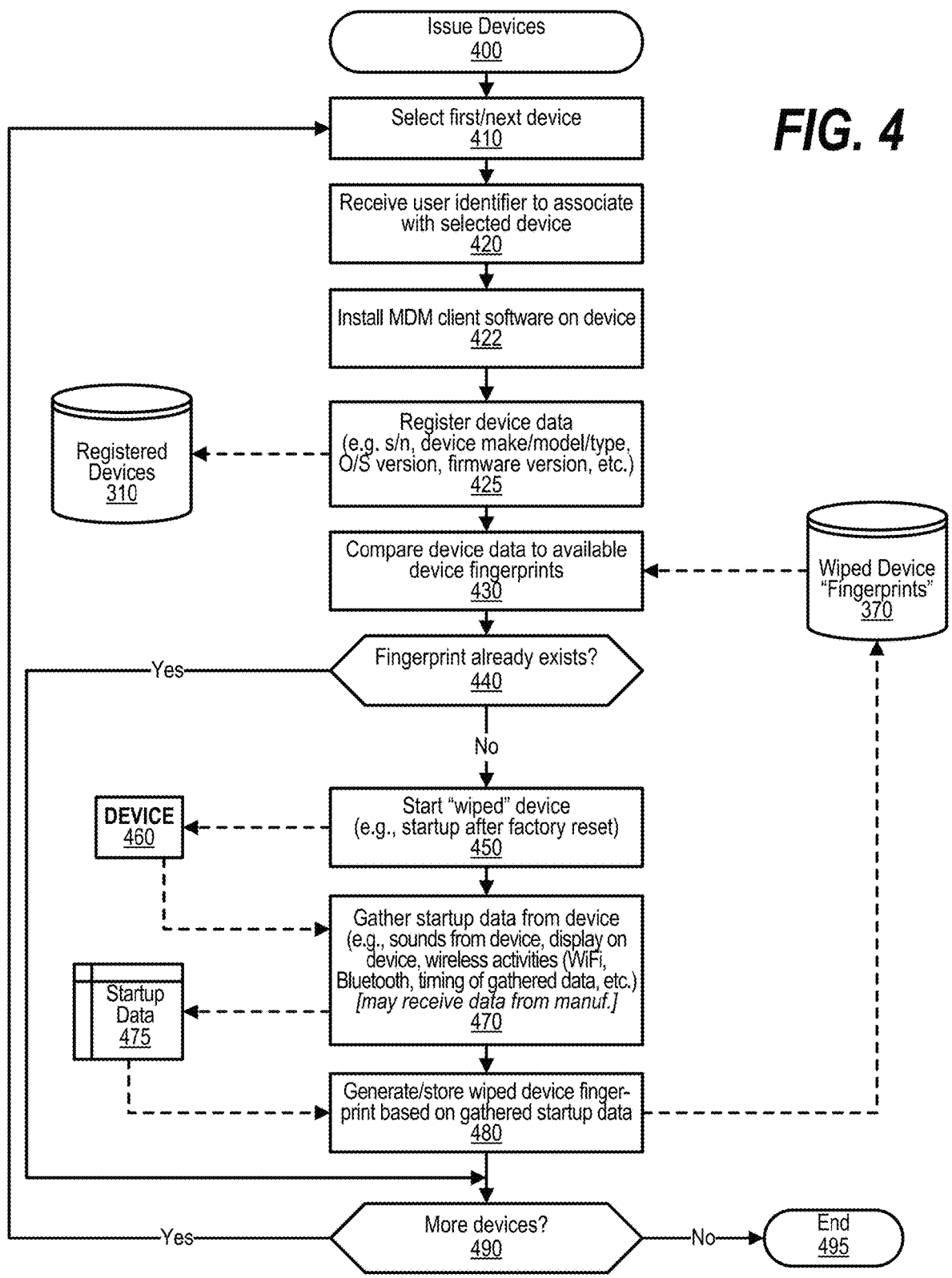
FIG. 4 is a flowchart depicting steps taken during a process when the device is issued to an individual in the organization.

FIG. 4 is a flowchart depicting steps taken during a process when the device is issued to an individual in the organization. FIG. 4 processing commences at 400 and shows the steps taken by a process that is used to issue devices to an organization's users. At step 410, the process selects the first device. At step 420, the process receives the user identifier, such as an employee number or identifier, to associate with the selected device. At step 422, the process installs mobile device management (MDM) client software on the selected device. At step 425, the process registers the device data (e.g. serial number, device make/model/type, O/S version, firmware version, etc.) and the associated user identifier with the data being stored in registered device data store 310.

At step 430, the process compares the device data (e.g., make, model, type, etc.) to the available device fingerprints that are retrieved from data store 370. The process determines as to whether a fingerprint already exists for the selected device (decision 440). If a fingerprint already exists, then decision 440 branches to the 'yes' branch bypassing steps 450 through 480. On the other hand, if a fingerprint does not exist, then decision 440 branches to the 'no' branch to perform steps 450 through 480.

Steps 450 through 480 are performed to capture a device fingerprint that will correspond to the selected device. At step 450, the process starts a "wiped" device 460 (e.g., startup a device that has been reset to factory settings, etc.). At step 470, the process gathers startup data from device 460 (e.g., sounds from device, display on device, wireless activities (WiFi, Bluetooth, timing of gathered data, etc.) and this data is stored in memory area 475. This data may be received from the manufacturer if such data is made available. At step 480, the process generates and stores a wiped device fingerprint based on gathered startup data with the generated fingerprint corresponding to the selected device and the fingerprint data being stored in data store 370.

The process determines as to whether there are more devices that are being issued (decision 490). If there are more devices being issued, then decision 490 branches to the 'yes' branch which loops back to step 410 to process the next device. This looping continues until no more devices are being issued, at which point decision 490 branches to the 'no' branch exiting the loop. FIG. 4 processing thereafter ends at 495.

Figure 5:
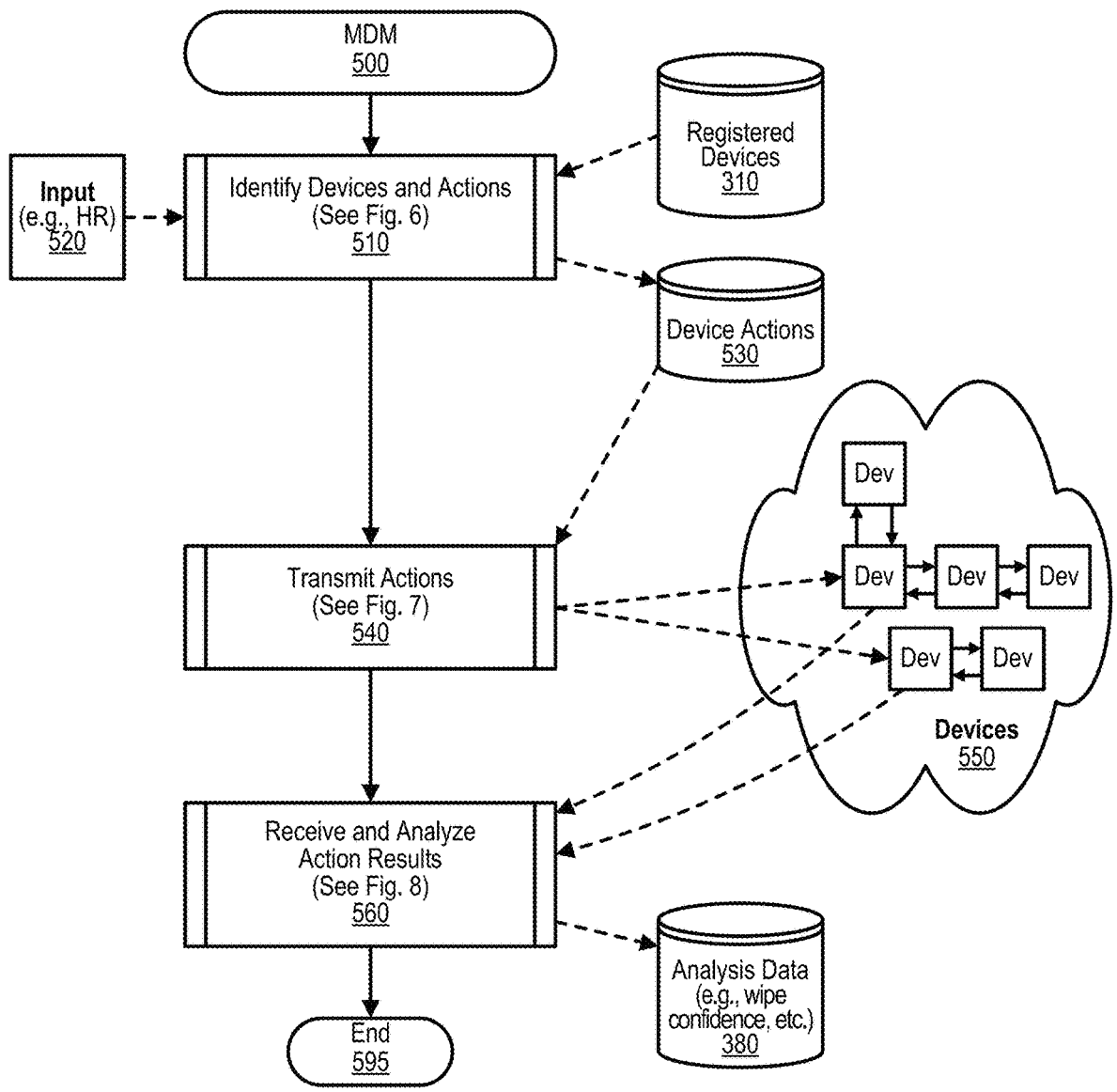
FIG. 5 is a high-level flowchart depicting the cognitive use of intermediary devices for control of portable computers and mobile devices.

FIG. 5 is a high-level flowchart depicting the cognitive use of intermediary devices for control of portable computers and mobile devices. FIG. 5 processing commences at 500 and shows the steps taken by a process that performs mobile device management (MDM).

Figure 6:
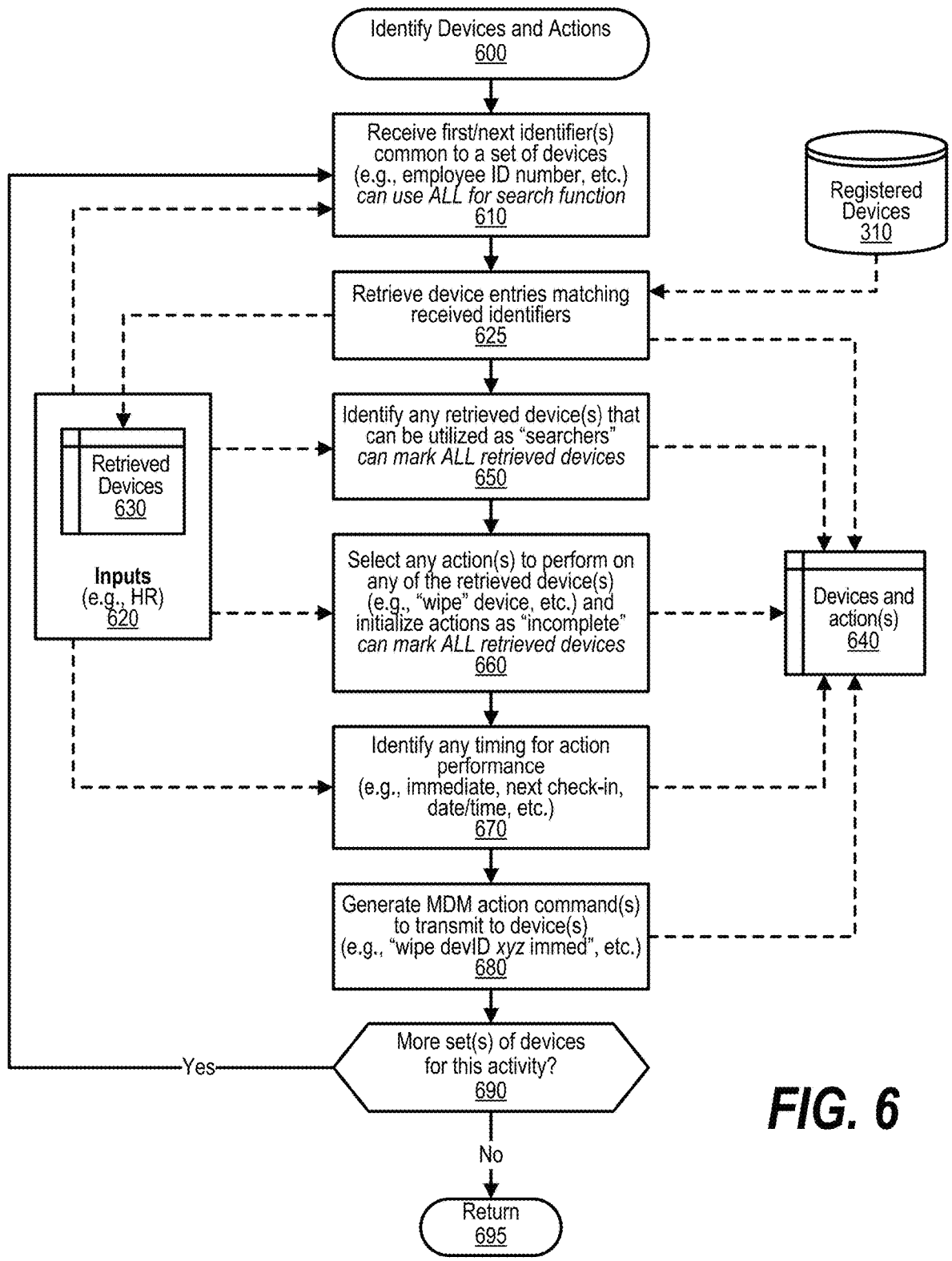
FIG. 6 is a flowchart depicting a process that identifies devices and actions.

At predefined process 510, the process performs the Identify Devices and Actions routine (see FIG. 6 and corresponding text for processing details). This routine receives data from an operator, such as a human resources professional, regarding a device that to which a command is being issued. Registered device data is retrieved from data store 310 and the device actions that are selected are stored in data store 530.

Figure 7:
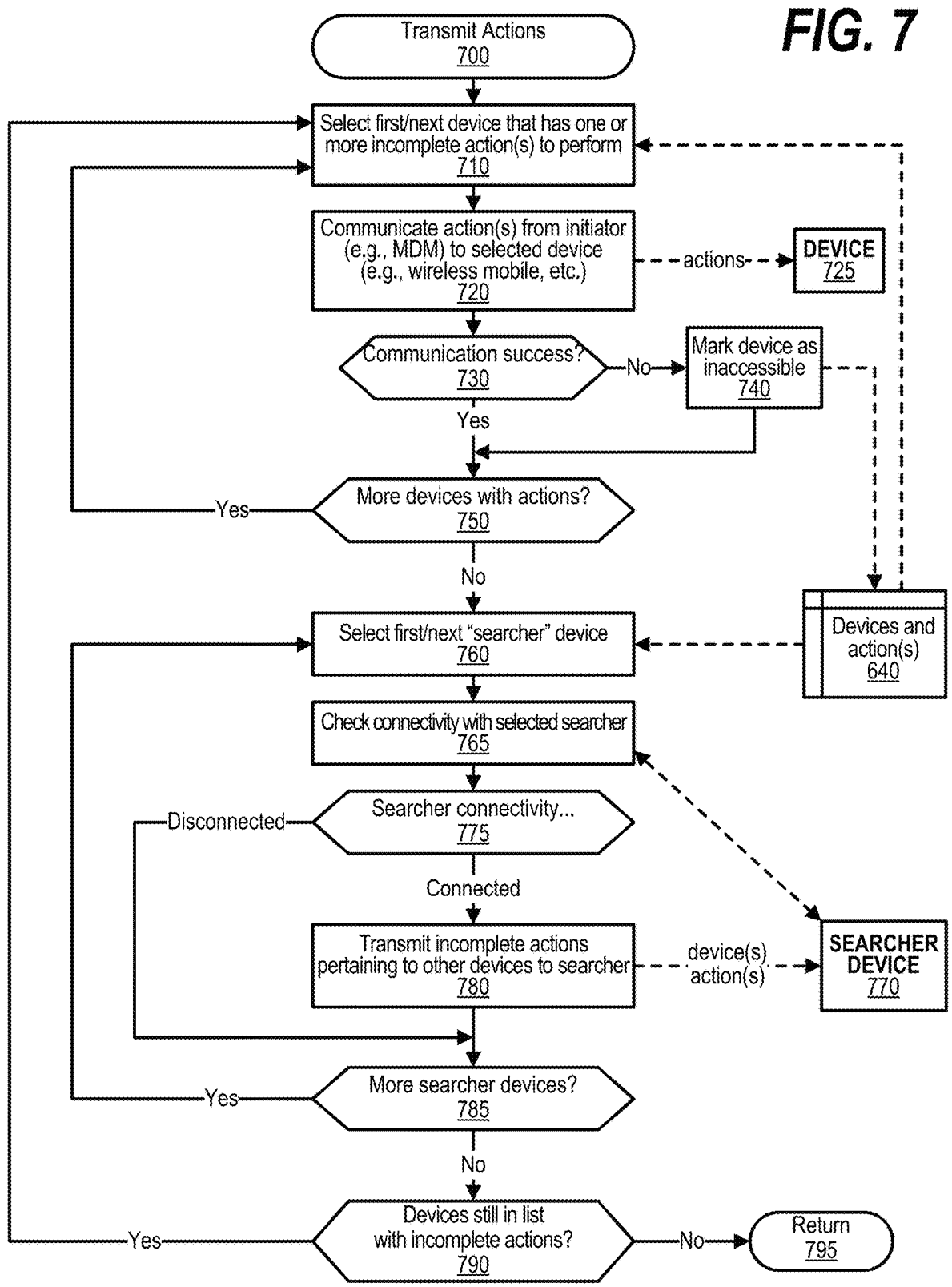
FIG. 7 is a flowchart depicting a process that transmits actions to devices.

At predefined process 540, the process performs the Transmit Actions routine (see FIG. 7 and corresponding text for processing details). This routine processes the device actions that were stored in data store 530 and transmits the commands to perform such actions to devices 550 with the devices including both intermediate devices used as a conduit as well as target devices upon which the actions are performed. An individual device can be both an intermediate device and a target device.

Figure 8:
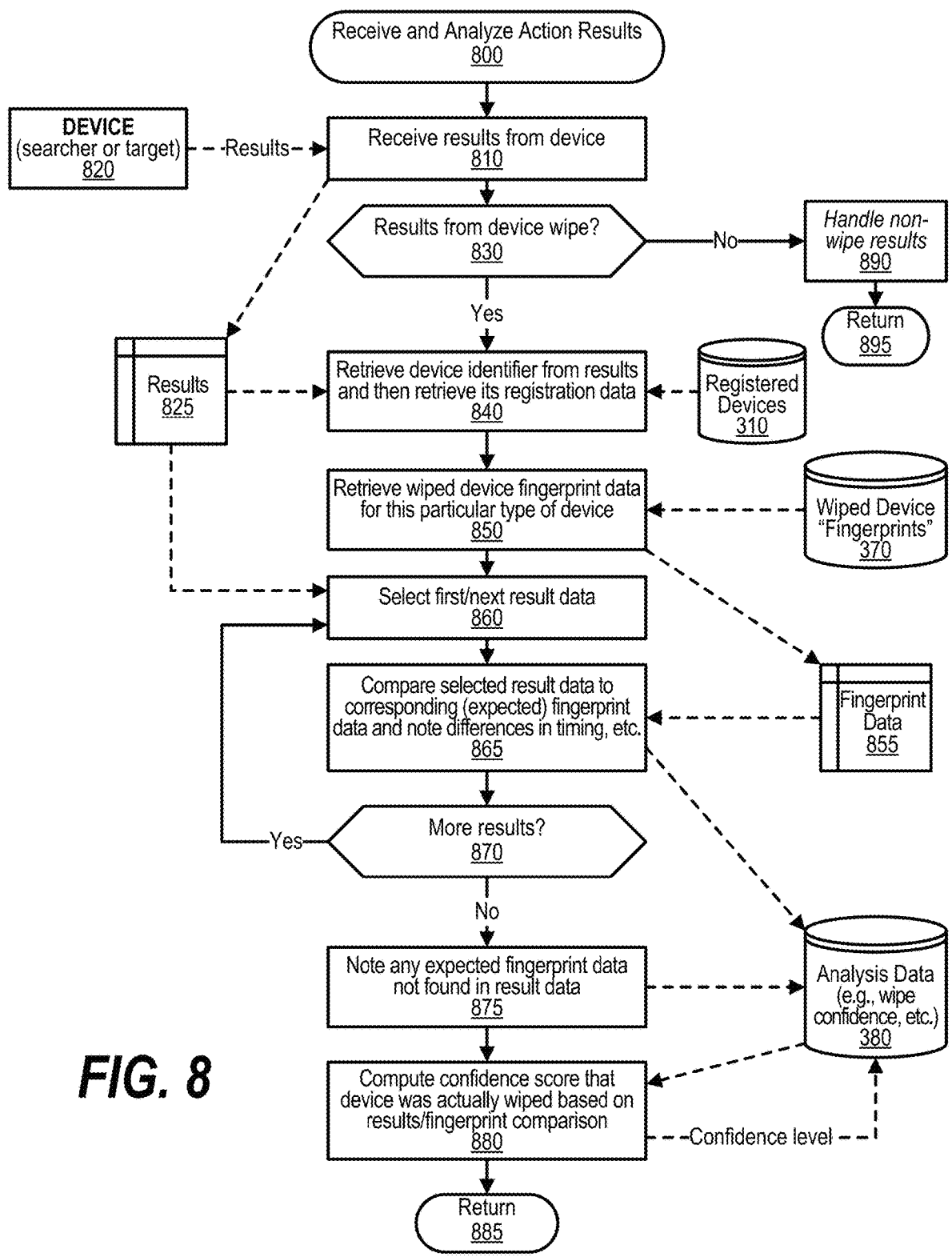
FIG. 8 is a flowchart depicting a process that receives and analyzes action results.

At predefined process 560, the process performs the Receive and Analyze Action Results routine (see FIG. 8 and corresponding text for processing details). This routine receives result data from devices 550 (target devices and intermediate devices), analyzes the results, and stores the results in data store 380. FIG. 5 processing thereafter ends at 595.

FIG. 6 is a flowchart depicting a process that identifies devices and actions. FIG. 6 processing commences at 600 and shows the steps taken by a process that identifies mobile devices and actions to perform on identified devices. Some devices may be identified as target devices while others might be identified as intermediate devices. A given device can be both an intermediate device and a target device. At step 610, the process receives the first identifier (or identifiers) common to a set of devices (e.g., an employee ID number, a department identifier, etc.). In addition, the user can select 'ALL' devices, such as for a search function.

The inputs are received from users 620, such as a person in the information technology (IT) department or the human resources (HR) department. At step 625, the process retrieves device entries matching the received identifier or identifiers. The device data is retrieved from data store 310 and those devices matching the selection criteria are stored in memory area 630.

At step 650, the process identifies any retrieved device(s) that can be utilized as "searchers." In one embodiment, ALL retrieved devices can be used as searcher (intermediate) devices. The devices and actions to perform are stored in memory area 640. At step 660, the process selects any action(s) to perform on any of the retrieved device(s) and these actions are written to memory area 640. For example, the user may wish to perform a "wipe" command on a device that has been lost or stolen or that is assigned to an employee that is leaving the organization. This step initializes all actions in memory area 640 as "incomplete" and can mark ALL retrieved devices accordingly. For example, if the organization is wiping ALL retrieved devices as they are assigned to an employee that is leaving the organization, then all of the retrieved devices corresponding to the employee can be marked to "wipe" all such devices.

At step 670, the process identifies any timing criteria for action performance. For example, timing criteria might be immediate, perform when device next checks-in to the MDM system, or at a specific date/time, etc. The timing criteria is also written to memory area 640. At step 680, the process generates MDM action command(s) to transmit to device(s). For example, an MDM action command might be "wipe devID xyz immed" indicating that a device with identifier 'xyz' is to execute the wipe command immediately upon reception of the action command. The generated MDM action command is also stored in memory area 640.

The process determines as to whether more sets of devices to select and assign an activity (decision 690). If there are more devices to select, then decision 690 branches to the 'yes' branch which loops back to step 610 to perform the steps for another device or group of device as described above. This looping continues until there are no more devices that the user wishes to select, at which point decision 690 branches to the 'no' branch exiting the loop. The activity might be the selection of searching devices, devices to which a specific command (e.g., "wipe," etc.) is being sent, etc. FIG. 6 processing thereafter returns to the calling routine (see FIG. 5) at 695.

FIG. 7 is a flowchart depicting a process that transmits actions to devices. FIG. 7 processing commences at 700 and shows the steps taken by a process that transmits actions to devices. At step 710, the process selects the first device that has one or more incomplete action(s) to perform. The devices, actions, and completion status are retrieved from memory area 640 that was created using the processing shown in FIG. 6. In one embodiment, "actions" are a subset of the "activities" discussed with regard to FIG. 6 above. "Activities" include searcher activities as well as action type activities (e.g., "wipe device," etc.).

At step 720, the process communicates the actions received from the initiating device (e.g., MDM) to the selected device 725 (e.g., wireless mobile device, etc.). The process determines as to whether communication with the device was successful (decision 730). If communication was successful, then decision 730 branches to the 'yes' branch bypassing step 740. On the other hand, if communication was not successful, then decision 730 branches to the 'no' branch whereupon, at step 740, the device is marked as inaccessible in memory area 640.

The process determines as to whether there more devices with incomplete actions (decision 750). If there are more devices with incomplete actions, then decision 750 branches to the 'yes' branch which loops back to step 710 to select and process the next device with incomplete actions. This looping continues until there are no more devices with incomplete actions, at which point decision 750 branches to the 'no' branch exiting the loop.

At step 760, the process selects the first "searcher" device from memory area 640. At step 765, the process checks for connectivity with the selected searcher device 770. The process determines as to whether the searcher device is connected to this device (decision 775). If the searcher is connected, then decision 775 branches to the 'connected' branch whereupon, at step 780 the process transmits incomplete actions pertaining to other devices to searcher device 770 so that the searcher device can be used to help find other devices. On the other hand, if the searcher device is disconnected from this device, then decision 775 branches to the 'disconnected' branch bypassing step 780.

The process determines as to whether there are more searcher devices to process (decision 785). If there are more searcher devices to process, then decision 785 branches to the 'yes' branch which loops back to step 760 that selects and processes the next searcher device from memory area 640. This looping continues until there are no more searcher devices to process, at which point decision 785 branches to the 'no' branch exiting the loop.

The process determines as to whether there are still devices in list 640 with incomplete actions (decision 790). If there are still devices in list 640 with incomplete actions, then decision 790 branches to the 'yes' branch which loops back to step 710 to re-perform the processing described above. This looping continues until there are no more devices with incomplete actions, at which point decision 790 branches to the 'no' branch exiting the loop. FIG. 7 processing thereafter returns to the calling routine (see FIG. 5) at 795.

FIG. 8 is a flowchart depicting a process that receives and analyzes action results. FIG. 8 processing commences at 800 and shows the steps taken by a process that receives and analyzes action results pertaining to a target device. At step 810, the process receives results from device 820 and stores the result data in memory area 825. The device might be an intermediate (searcher) device or might be a target device. The process determines as to whether the results are from a device wipe command or instruction (decision 830). If results are from a device wipe, then decision 830 branches to the 'yes' branch to perform steps 840 through 885. On the other hand, if the results are not from a device wipe, then decision 830 branches to the 'no' branch whereupon, at step 890, the process handles non-wipe results and processing returns to the calling routine (see FIG. 5) at 895.

Steps 840 through 885 are performed to handle results from a wipe command or instruction. At step 840, the process retrieves the device identifier from the results (memory area 825) and then retrieves its registration data from data store 310. At step 850, the process retrieves the wiped device fingerprint data for this particular type of device with the fingerprint data being retrieved from data store 370 and stores the selected fingerprint (expected) data in memory area 855.

At step 860, the process selects the first result data from memory area 825. At step 865, the process compares the selected result data to the corresponding (expected) fingerprint data and note differences in timing, etc. The resulting comparison data is stored in data store 380. The process determines as to whether there are more result data to process (decision 870). If there are more result data to process, then decision 870 branches to the 'yes' branch which loops back to step 860 to select and process the next set of result data. This looping continues until all of the result data has been processed, at which point decision 870 branches to the 'no' branch exiting the loop.

At step 875, the process notes any expected fingerprint data that was not found in result data and stores this information in data store 380. At step 880, the process computes a confidence score relating to a confidence level that the device was actually wiped based on the comparison of the result data with the expected data. This confidence score is also stored in data store 380. FIG. 8 processing thereafter returns to the calling routine (see FIG. 5) at 885.

Figure 9:
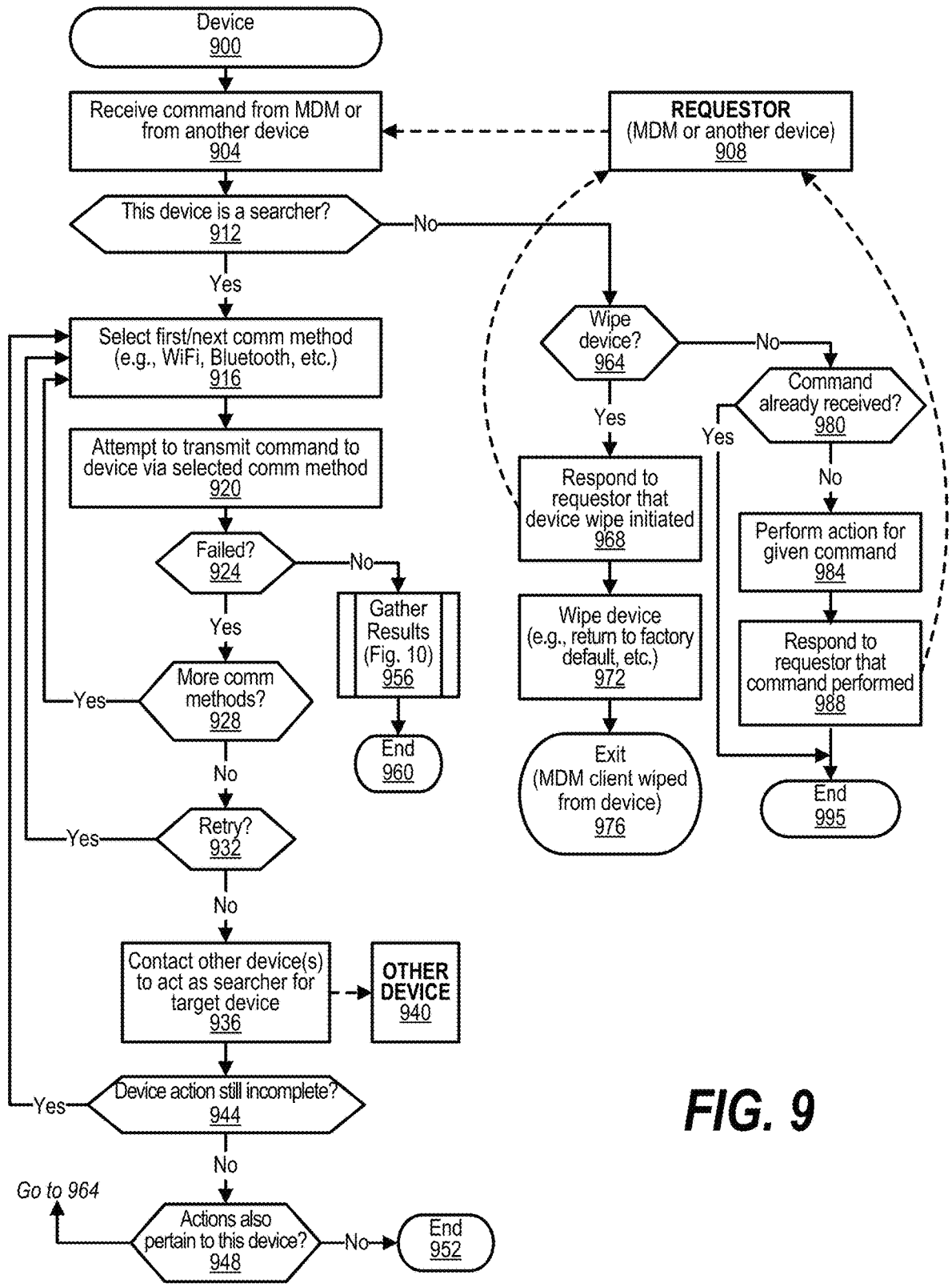
FIG. 9 is a flowchart depicting processing from an individual device's perspective.

FIG. 9 is a flowchart depicting processing from an individual device's perspective. FIG. 9 processing commences at 900 and shows the steps taken at a device that is either an intermediate (searcher) device or a target device. A given device can be both an intermediate device as well as a target device. At step 904, the process receives a command from requestor 908 with the requestor being an initiating device (e.g., MDM system, etc.) or from another (intermediate) device.

The process determines as to whether this device being used a searcher (intermediate) device (decision 912). If this device is being used a searcher (intermediate) device, then decision 912 branches to the 'yes' branch to perform steps 920 through 960. On the other hand, if this device is not being used a searcher (intermediate) device (is a target only), then decision 912 branches to the 'no' branch to perform steps 964 through 995.

Steps 916 through 960 are performed at devices that are being used as intermediate (searcher) devices. At step 916, the process selects the first communication method (e.g., WiFi, Bluetooth, etc.). At step 920, the process attempts to transmit command to a target device via the selected communication method. The process determines as to whether communication with the target device failed (decision 924). If communication failed, then decision 924 branches to the 'yes' branch for further processing. On the other hand, if communication was successful, then decision 924 branches to the 'no' branch whereupon, at predefined process 956 the process gathers results (see FIG. 10 and corresponding text for processing details) and this device processing ends at 960.

If communication with the target device was unsuccessful, then the process determines whether there are more communication methods to try to communicate with the target device (decision 928). If there are more communication methods, then decision 928 branches to the 'yes' branch which loops back to step 916 to try to communicate with the target device using a different communication method. This looping continues until communication is successful (decision 924 branching to the 'no' branch) or there are no more communication methods to use, at which point decision 928 branches to the 'no' branch exiting the loop. The process determines as to whether to retry establishing communications from the device to the target device (decision 932). If retrying, then decision 932 branches to the 'yes' branch which loops back to step 916 to re-perform the above steps to try to establish communications with the target device. This looping continues until either successful (decision 924 branching to the 'no' branch) or no more retries are to be performed. If no more retries are being performed, then decision 932 branches to the 'no' branch exiting the loop.

At step 936, the process contacts other device(s) to act as a searcher (intermediate device) for communicating with the target device. After a waiting period, the process determines to whether the target device action is still incomplete (decision 944). If the device action is still incomplete, then decision 944 branches to the 'yes' branch which loops back to step 916 to re-perform the above-described steps. This looping continues until the device action is noted as complete (either by this intermediate device or by another intermediate device), at which point decision 944 branches to the 'no' branch exiting the loop. In one embodiment, the process can also be stopped by the MDM sending out an instruction to stop the device or when a particular amount of time has elapsed (e.g., after searching for the device for one week, a month, etc.).

The process determines as to whether actions also pertain to this device (decision 948) indicating that this device is both an intermediate device and a target device. If actions also pertain to this device, then decision 948 branches to the 'yes' branch and processing branches to decision 964 described below. On the other hand, if the actions do not pertain to this device, then decision 948 branches to the 'no' branch and this device processing ends at 952. Steps 964 through 995 are performed when the device is a target device.

At decision 964, the process determines as to whether the command or instruction is to wipe the device. If the command or instruction is to wipe the device, then decision 964 branches to the 'yes' branch to perform steps 968 through 976. On the other hand, if the command or instruction is not to wipe the device, then decision 964 branches to the 'no' branch to perform steps 980 through 995.

Steps 968 through 978 are performed when wiping the device. At step 968, the process responds to requestor that device wipe instruction has been received and is being initiated. At step 972, the process wipes the device, such as by erasing memory areas and returning the device to a factory default setting, etc. FIG. 9 processing thereafter ends at 976 with the device exiting the MDM routine as the MDM has likely been wiped (removed) from the device.

Steps 980 through 995 are performed in response to a non-wipe instruction. At decision 980, the process determines as to whether the command has already received from a different intermediate device. If the command already received, then decision 980 branches to the 'yes' branch bypassing steps 984 through 988. On the other hand, if this is the first time the command has been received, then decision 980 branches to the 'no' branch to perform steps 984 and 988. At step 984, the process performs the action corresponding to the given command and, at step 988, the process responds to the requestor informing the requestor (initiating device or intermediate device) that the command has been performed along with any result data. Processing at the device thereafter ends at 995.

Figure 10:
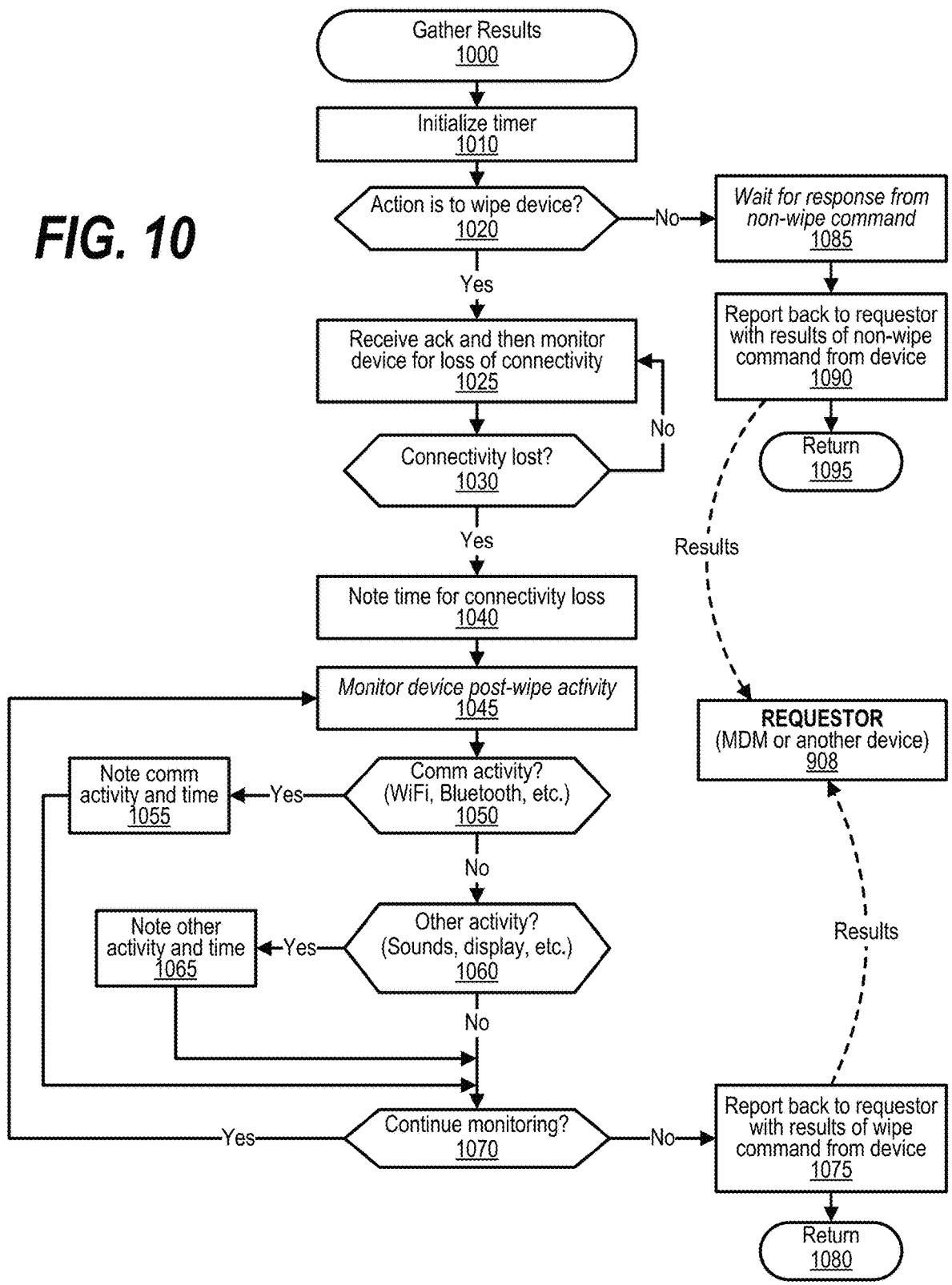
FIG. 10 is a flowchart depicting a process that gathers results at an individual device.

FIG. 10 is a flowchart depicting a process that gathers results at an individual device. FIG. 10 processing commences at 1000 and shows the steps taken by a process that gathers results at a device (e.g., an intermediate device or device proximate to a target device, etc.) detected from a target device. The device that gathers the data as discussed in FIG. 10 can be an intermediate device or the initiating device. For some of the data gathering steps, the data gathering device (e.g., initiating device, intermediate device, etc.) might need to be nearby, or proximate, to the target device in order to gather some of the data.

At step 1010, the process initializes a timer. The process determines as to whether the action is to wipe the target device (decision 1020). If the action is to wipe the target device, then decision 1020 branches to the 'yes' branch to perform steps 1025 through 1080. On the other hand, if the action is not to wipe the target device, then decision 1020 branches to the 'no' branch whereupon, at step 1085, the process waits for a response from the target device regarding the non-wipe command, reports back to the requestor device 908 with results from the non-wipe command, and processing returns to the calling routine (see FIG. 9) at 1095.

Steps 1025 through 1080 are performed when a wipe command was sent to the target device. At step 1025, the process running on the intermediate device receives an acknowledgement of the wipe command from the target device and then monitors the target device for loss of connectivity. This could be multiple different types of connectivity that may shut down at different times during the wipe, for example WiFi and Bluetooth connectivity might be lost at different times during the process. The process determines as to whether connectivity with the target device has been lost (decision 1030). If connectivity has not been lost, then decision 1030 branches to the 'no' branch which continues to loop back to step 1025. This looping continues until connectivity with the target device has been lost, at which point decision 1030 branches to the 'no' branch exiting the loop. At step 1040, the process notes the time (elapsed time, etc.) for connectivity loss.

At step 1045, the process monitors the target device for post-wipe instruction activity. The process determines as to whether communication activity, such as WiFi, Bluetooth, etc. is detected (decision 1050). If communication activity is detected, then decision 1050 branches to the 'yes' branch and at step 1055, the process notes the communication activity and time. On the other hand, if no communication activity is detected, then decision 1050 branches to the 'no' branch for further processing. The process determines as to whether other activity, such as sounds or display activity, is detected at the target device (decision 1060). If other activity is detected, then decision 1060 branches to the 'yes' branch whereupon at step 1065, the process notes the other activity that was detected and the time. On the other hand, if other activity is not detected, then decision 1060 branches to the 'no' branch.

The process determines whether to continue monitoring the target device for communication or other activity (decision 1070). If monitoring continues, then decision 1070 branches to the 'yes' branch which loops back to step 1045 to continue monitoring the target device as described above. This looping continues until monitoring discontinues (e.g., time period elapses, etc.), at which point decision 1070 branches to the 'no' branch exiting the loop. At step 1075, the process reports back to requestor 908 with the results gathered from the monitoring of the target device after the wipe command. FIG. 10 processing thereafter returns to the calling routine (see FIG. 9) at 1080.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method comprising:
    transmitting a command from an initiating device, wherein the command is directed to a target device, and wherein the target device is not accessible over a first network or a second network by the initiating device;
    sending the command through a plurality of receiving devices, wherein one of the receiving devices is the target device and wherein at least one of the receiving devices is an intermediate device, and wherein the sending comprises sending the command from the initiating device to the intermediate device using a first communications protocol over the first network, and wherein the target device receives the command using a second communications protocol over the second network;
    gathering, by the intermediate device, target device activity after reception of the command by the target device, wherein the gathering of the target device activity further comprises:
        identifying a first elapsed time when connectivity between the intermediate device and the target device is interrupted; and
        identifying, after the connectivity interruption, one or more communication activities detected at the target device and a time data corresponding to each of the communication activities; and
    transmitting the gathered target device activity back to the initiating device via the intermediate device.

2. The method of claim 1 further comprising:
    searching a first set of the receiving devices that are intermediate devices that each communicate directly with the initiating device; and
    searching, from the first set of receiving devices, one or more second sets of intermediate devices wherein at least one of the second set of intermediate devices is disconnected from the target device.

3. The method of claim 2 further comprising:
    determining that a selected one of the second set of intermediate devices is able to connect to the target device;
    transmitting one or more instructions to the selected intermediate device to send the command to the target device; and
    detecting, at the selected intermediate device, that the target device received the command.

4. The method of claim 3 wherein the command is a wipe command to erase a plurality of memory areas at the target device.

5. The method of claim 1 further comprising:
    detecting, at the intermediate device, that the command was executed by the target device; and
    notifying the initiating device, by the intermediate device, that the command was executed by the target device.

6. An information handling system comprising:
    one or more processors;
    a memory coupled to at least one of the processors; and
    a set of computer program instructions stored in the memory and executed by at least one of the processors in order to perform actions comprising:

transmitting a command from an initiating device, wherein the command is directed to a target device, and wherein the target device is not accessible over a first network or a second network by the initiating device;

sending the command through a plurality of receiving devices, wherein one of the receiving devices is the target device and wherein at least one of the receiving devices is an intermediate device, and wherein the sending comprises sending the command from the initiating device to the intermediate device using a first communications protocol over the first network, and wherein the target device receives the command using a second communications protocol over the second network;

gathering, by the intermediate device, target device activity after reception of the command by the target device, wherein the gathering of the target device activity further comprises:

identifying a first elapsed time when connectivity between the intermediate device and the target device is interrupted; and identifying, after the connectivity interruption, one or more communication activities detected at the target device and a time data corresponding to each of the communication activities; and transmitting the gathered target device activity back to the initiating device via the intermediate device.

7. The information handling system of claim 6 further comprising:

searching a first set of the receiving devices that are intermediate devices that each communicate directly with the initiating device; and searching, from the first set of receiving devices, one or more second sets of intermediate devices wherein at least one of the second set of intermediate devices is disconnected from the target device.

8. The information handling system of claim 7 further comprising:

determining that a selected one of the second set of intermediate devices is able to connect to the target device;

transmitting one or more instructions to the selected intermediate device to send the command to the target device; and detecting, at the selected intermediate device, that the target device received the command.

9. The information handling system of claim 8 wherein the command is a wipe command to erase a plurality of memory areas at the target device.

10. The information handling system of claim 6 further comprising:

detecting, at the intermediate device, that the command was executed by the target device; and notifying the initiating device, by the intermediate device, that the command was executed by the target device.

11. A computer program product comprising:

a non-transitory computer readable storage medium comprising a set of computer instructions, the computer instructions effective to perform actions comprising:

transmitting a command from an initiating device, wherein the command is directed to a target device, and wherein the target device is not accessible over a first network or a second network by the initiating device;

sending the command through a plurality of receiving devices, wherein one of the receiving devices is the target device and wherein at least one of the receiving devices is an intermediate device, and wherein the sending comprises sending the command from the initiating device to the intermediate device using a first communications protocol over the first network, and wherein the target device receives the command using a second communications protocol over the second network;

gathering, by the intermediate device, target device activity after reception of the command by the target device, wherein the gathering of the target device activity further comprises:

identifying a first elapsed time when connectivity between the intermediate device and the target device is interrupted; and identifying, after the connectivity interruption, one or more communication activities detected at the target device and a time data corresponding to each of the communication activities; and transmitting the gathered target device activity back to the initiating device via the intermediate device.

12. The computer program product of claim 11 further comprising:

searching a first set of the receiving devices that are intermediate devices that each communicate directly with the initiating device; and searching, from the first set of receiving devices, one or more second sets of intermediate devices wherein at least one of the second set of intermediate devices is disconnected from the target device.

13. The computer program product of claim 12 further comprising:

determining that a selected one of the second set of intermediate devices is able to connect to the target device;

transmitting one or more instructions to the selected intermediate device to send the command to the target device; and detecting, at the selected intermediate device, that the target device received the command.

14. The computer program product of claim 11 further comprising:

detecting, at the intermediate device, that the command was executed by the target device; and notifying the initiating device, by the intermediate device, that the command was executed by the target device.

* * * * *